United States Patent [19]

Franceschini

[11] Patent Number: 5,207,757
[45] Date of Patent: May 4, 1993

[54] SELF-RIGHTING AND SELF-BALLASTING WATERFOWL DECOY

[75] Inventor: Augusto Franceschini, Rero, Italy
[73] Assignee: Carry-Lite, Inc., Milwaukee, Wis.
[21] Appl. No.: 851,098
[22] Filed: Mar. 13, 1992
[51] Int. Cl.5 .......................................... A01M 31/06
[52] U.S. Cl. ............................................... 43/3
[58] Field of Search ............................. 43/2, 3

[56] References Cited

U.S. PATENT DOCUMENTS

| | | | |
|---|---|---|---|
| 934,342 | 9/1909 | Oliver | 43/3 |
| 2,342,107 | 2/1944 | Agius | 43/3 |
| 2,903,812 | 9/1959 | Lewis | 43/3 |
| 3,704,538 | 12/1972 | Gagnon | 43/3 |
| 3,733,733 | 5/1973 | Ruter | 43/3 |
| 3,798,820 | 3/1974 | Dye | 43/3 |
| 3,834,054 | 9/1974 | Gentry | 43/3 |
| 3,896,578 | 7/1975 | Franceschini . | |
| 4,691,463 | 9/1987 | DeKezel | 43/3 |

Primary Examiner—Kurt C. Rowan
Attorney, Agent, or Firm—Nilles & Nilles

[57] ABSTRACT

A self-ballasting waterfowl decoy which is also self-righting includes a floating body in the form of a closed hollow shell representing a waterfowl, a ballast tank attached to the underside of the decoy by a connecting rib, with the elongated hollow tubular ballast tank having at one end an opening below the waterline for the passage of water and at the opposite end an air duct for the escape of air, and includes a long metal tube within the ballast tank. In the event that a decoy tossed out onto a body of water lands on its backside, the metal tube provides just enough weight to tip the decoy upright and thereby providing for a self-righting decoy.

5 Claims, 1 Drawing Sheet

SELF-RIGHTING AND SELF-BALLASTING WATERFOWL DECOY

BACKGROUND OF THE INVENTION

This invention relates to a floating waterfowl decoy used for hunting which is both self-ballasting and self-righting.

Many floating artificial decoys which represent waterfowl are known in the field. My earlier U.S. Pat. No. 3,896,578 discloses a self-ballasting decoy comprised of a floating body which represents the waterfowl and which carries attached to its underside a ballast tank. The ballast tank is formed by an elongated hollow tube having a water opening and an air duct. As the decoy rests on the water, the opening in the ballast tank lies beneath the waterline and the air duct extends upward from the tube portion of the ballast tank to a point above the waterline. When the decoy is set into the water, water enters the ballast tank through the opening and, as the ballast tank fills with water, air escapes through the air duct. Further, when the decoy is picked up by the hunter, water easily pours out of the ballast tank from the opening as air flows into the ballast tank through the air duct. This type of decoy with a self-ballasting keel is sold under the trademark Aqua-Keel TM by Carry-Lite, Inc.

Another type of water-filled keel for a floating decoy is known as the water keel, which is just a straight, long hollow plastic tube connected underneath the body of the decoy. Unlike the Aqua-Keel, the water keel does not act as a ballast chamber, but water nonetheless passes through the open tube so that the water keel acts much like a rudder for the decoy.

One problem associated with the Aqua-Keel and water keel type decoys is that a hunter in a blind on shore or in a boat may throw the decoy (and probably several of them) out onto the water, but the decoy may land on its back and not tip over to an upright position. An upside-down decoy is itself useless for attracting birds for the hunt and may destroy entirely the effect of several decoys laid out as a small flock.

SUMMARY OF THE INVENTION

A self-ballasting waterfowl decoy which is also self-righting is disclosed. The invention is basically an improvement over the Aqua-Keel and water keel type decoys in that the keel is provided with a weighted material. In the event the decoy lands on its backside in a body of water, the extra weight in the keel is just enough to tip the decoy to a sufficiently upright position whereby water enters the opening of the ballast tank or keel.

More specifically, the invention comprises an improved self-ballasting floating waterfowl decoy which includes a floating body in the form of a waterfowl, a ballast tank attached to the underside of the floating body wherein the ballast tank has an opening below the waterline for the passage of water and an air duct above the waterline for the escape of air, and a long metal tube within the ballast tank. The metal tube should not add too much weight, but rather should provide only the minimum weight necessary to make the decoy self-righting. Further, the tube does not interfere with the passage of water through the ballast tank since the metal tube is also hollow and allows water to pass through it. A tube further provides a large enough diameter, as opposed to a solid metal rod, so once in place within the ballast tank the tube will not fall out.

DESCRIPTION OF THE PREFERRED EMBODIMENT

Figure 1:
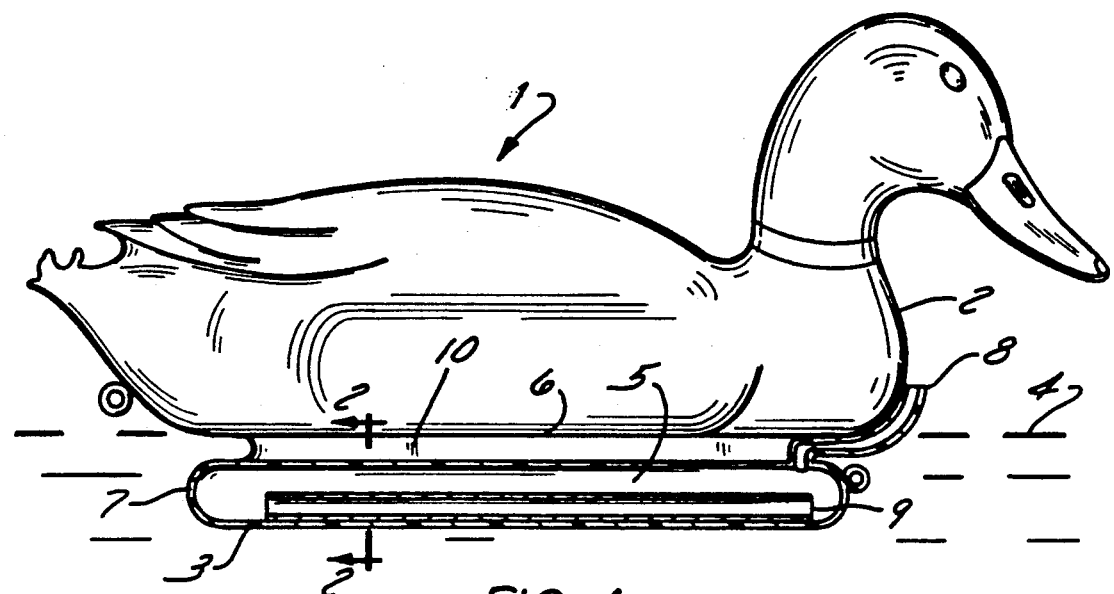
FIG. 1 is a side view, with the ballast tank in section, of a self-righting and self-ballasting waterfowl decoy according to the invention.
Figure 2:
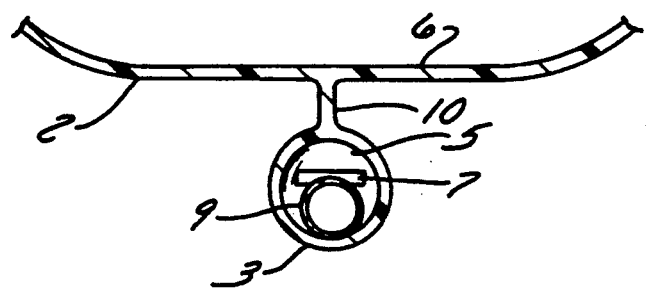
FIG. 2 is a cross section of the ballast tank and tube as shown at line 2—2 of FIG. 1.

The preferred embodiment of a self-righting and self-ballasting waterfowl starts first with an Aqua-Keel type decoy 1 (i.e. a self-ballasting decoy) as disclosed in U.S. Pat. No. 3,896,578 to Franceschini, which is incorporated by reference herein. The decoy 1 includes a floating body 2 and ballasting tank 3.

The floating body 2 is a large, hollow shell made from either soft or rigid plastic formed in the shape of a waterfowl, including the body, head and neck of the bird. It is provided with the shape, texture and colors so as to accurately simulate a duck or other waterfowl as it would appear on the surface of a body of water 4.

The ballast tank 3 is an elongated, tubular body section attached to the underside 6 of the floating body 2 by means of a longitudinal depending connecting rib 10. The ballast tank 3 also has a hollow compartment 5 for holding ballast material, in this case water, and the hollow compartment 5 is isolated from the hollow shell of the floating body 2.

At one end of the long hollow compartment 5 of the ballast tank 3, preferably on the rear or tail side of the decoy, is a water opening 7 which, when the decoy is set in the water 4, allows water to enter the ballast tank 3. On the opposite end, along the breast of the decoy 1, is an air duct 8 which extends upward from the ballast tank to a point above the waterline.

Placed within the ballast tank is a long hollow metal tube or pipe 9. The pipe 9 may be either just inserted inside the ballast tank 3, or it might be molded in place in the manufacturing process. The purpose of the pipe 9 is to add sufficient weight to the ballast tank 3 so that, in the event the hunter throws the decoy 1 into the water 4 and the decoy 1 lands on its backside (i.e. with the ballast tank 3 above the waterline), the tube 9 provides just enough weight to tip the decoy 1 over in a sufficiently upright position so that the opening 7 in the ballast tank falls below the waterline so that water may enter it, and thus provide the ballast to maintain the decoy in an upright position despite strong wind or waves.

Decoys are often carried a substantial distance to the hunting area, so the tube 9 preferably provides just enough weight to make the decoy self-righting, but no more. For instance, in Carry-Lite's 4200 and 4000 series decoys, the hollow pipe is 11 cm long, 2 cm in diameter, and has a wall thickness of only 2 mm.

A hollow tube or pipe 9 is preferable over a metal rod or other weight since water may flow through a tube. Further, since the water opening 7 into the ballast tank 3 is a narrow slit, a tube 9 has a sufficient diameter so that once it is inserted into the ballast tank 3 it will not fall out. The tube 9 may be made of ordinary steel or other common metal which, even if it rusts, should last the life of the decoy.

I claim:

1. An improved self-ballasting floating waterfowl decoy of the type including:
   a. a floating body in the form of a closed hollow shell representing a waterfowl, having an underside intended to directly rest on the water and a waterline located above said underside whenever the decoy is used;
   b. a connecting rib depending from the underside longitudinally along said floating body; and
   c. a ballast tank attached to said connecting rib and spaced at some distance from the underside of said floating body below the waterline thereof, said tank being in the form of a longitudinally elongated hollow tubular body closed at each end and being provided in correspondence to the bottom of said tank at one of said ends with an opening for the passage of the water, and, in correspondence to the top of the opposite end with an upwardly directed air duct, terminating with its free end above the waterline of the floating body for the escape of air from said tank;
wherein the improvement comprises
   d. a hollow metal pipe section inserted within the ballast tank having the minimum weight necessary to, in the event the decoy lands on its backside in a body of water, tip the decoy to a sufficiently upright position whereby water enters the opening of the ballast tank.

2. The decoy according to claim 1 wherein said floating body, connecting rib and ballast tank are made of one-piece plastic material and the hollow metal pipe section is set within the ballast tank.

3. The decoy according to claim 2 wherein the hollow metal pipe section is molded into the plastic material of the ballast tank.

4. The decoy according to claim 2, wherein the opening in the ballast tank is a narrow slit and the metal tube has a diameter which is larger than the width of the slit.

5. An improved method for manufacturing a self-ballasting floating decoy waterfowl, wherein the method includes blow molding a hollow body representing a waterfowl, ballast tank and connecting rib as a one-piece unit in a single operation in a mold provided with separate cavities for the hollow body, the ballast tank and an air duct connected thereto, injecting compressed air for the blow molding separately into each cavity, and thereafter cutting suitable portions of the resulting molded article to form an opening in the ballast tank for the passage of the water and an opening in the free end of the air duct, the improvement comprising inserting within the ballast tank a long hollow metal tube through the opening whereby the decoy becomes self-righting upon placement of the decoy on a body of water.

* * * * *